United States Patent [19]

Pinard et al.

[11] Patent Number: 5,657,446
[45] Date of Patent: Aug. 12, 1997

[54] LOCAL AREA COMMUNICATIONS SERVER

[75] Inventors: Deborah L. Pinard, Kanata; Harold Sit, Gloucester; Anthony Niro, Ottawa, all of Canada

[73] Assignee: Mitel Corporation, Kanata, Canada

[21] Appl. No.: 339,463

[22] Filed: Nov. 14, 1994

[51] Int. Cl.$^6$ ................................................. G06F 15/00
[52] U.S. Cl. ................... 379/90.01; 379/201; 379/93.09
[58] Field of Search ........................ 395/200.01, 200.02, 395/200.06, 200.1, 200.2, 650; 379/84, 89, 94, 96, 201, 214, 218

[56] References Cited

U.S. PATENT DOCUMENTS

| | | | |
|---|---|---|---|
| 4,855,905 | 8/1989 | Estrada et a. | 395/500 |
| 4,866,758 | 9/1989 | Heinzelmann | 379/94 |
| 5,208,811 | 5/1993 | Kashio et al. | 370/94.1 |
| 5,237,693 | 8/1993 | Kiyohara et al. | 395/200.01 |
| 5,453,984 | 9/1995 | Mueller | 370/85.13 |
| 5,479,487 | 12/1995 | Hammond | 379/67 |
| 5,485,370 | 1/1996 | Moss et al. | 364/408 |

FOREIGN PATENT DOCUMENTS 0 545 551 A1  9/1993  European Pat. Off. ......... H04N 1/32

*Primary Examiner*—Glenn A. Auve
*Attorney, Agent, or Firm*—Charles E. Wands

[57] ABSTRACT

A communication system is comprised of a computer system connected to a LAN, a local area communications system (LAX) connected to the LAN, peripheral communications devices connected to the LAX, apparatus for controlling communications between the devices via the LAX under control of programs resident in a computer of the computer system, the controlling apparatus comprising a database for storing server system configuration data, a peripheral driver, a call control for controlling the peripheral driver and accessing application programs and the system configuration data, and a protocol converter for passing control and data messages in manners proprietary to each peripheral communications device from and to the peripheral communications devices via peripheral drivers and to and from a variety of standard and non-standard application programs stored in the computer system.

16 Claims, 6 Drawing Sheets

LOCAL AREA COMMUNICATIONS SERVER

FIELD OF THE INVENTION

This invention relates to the fields of computers and communications, and relates to a specialized telecommunications server system to facilitate integration of computer functions to provide enhanced communications functions.

BACKGROUND TO THE INVENTION

In the past, the integration of communications to the general purpose computer (e.g. the personal computer) functional environment has been either highly specialized, or expensive and limited in capability.

In simplest form, a computer can control communications by means of a modem, which interfaces directly with a telephone line. A telephone switching system receives digits and controls the progress of a call as if it were a telephone call. There is no possibility of providing enhanced services by controlling the switching system itself from the computer.

Computers have been connected to lines or trunks in a central switching (e.g. PABX) system, or to a main switching system bus, in order to automatically detect the number of an incoming call and to provide, to an operator on the computer screen the name and other details of an incoming caller immediately upon the operator answering the call. In this case the computer obtains the incoming call number and merely accesses a database stored in its memory, and provides data to the operator by displaying the database information on it display. There is no possibility of controlling the functioning of the switching system itself.

It would be desirable to be able to detect that the calling party has a videophone or enhanced set that can display live rate video, to access a video commercial or promotion associated with the PABX related to the types of products the calling party is known to favor, resulting from record of past purchases, to configure the PABX to establish a wideband channel to the calling party, and to play the commercial or promotion while the calling party is waiting for service by an operator. This is not possible to do at the present time. While a computer can be connected to a PABX to perform sophisticated functions via a host command interface (HCI) trunk, it cannot reconfigure the PABX itself to provide enhanced services.

As another example of a computer to communications device interface, a fax modem server is connected to a local area network (LAN) to which plural computers are connected, whereby plural computers can share the services of the fax modem via the LAN. In present systems only the specialized services of the fax modem can be provided, and obviously this is restricted to fax functions only.

SUMMARY OF THE INVENTION

The present invention is a system which provides a local area communication system (LAX) as a server on a LAN. As a result, during the processing or initiation of a call a computer connected to the LAN can implement applications programs and directly interact with the processing of a call in the LAX.

The computer can implement client based applications programs while the LAX can implement server based applications. With the server containing drivers for, and being connected to peripherals such as telephones, voice mail devices, fax modem devices, trunks, multimedia devices, billing control devices, administrative and maintenance devices, etc., the computer can directly control which of the devices, and channel requirements if necessary, to use for applications based in the computer. Thus the aforenoted system which implements multimedia communication with the caller, for example, may be provided.

In accordance with an embodiment of the invention, a communication system is comprised of a computer system connected to a LAN, a local area communications system (LAX) connected to the LAN, peripheral communications devices connected to the LAX, apparatus for controlling communications between the devices via the LAX under control of programs resident in a computer of the computer system, the controlling apparatus comprising a database for storing server system configuration data, a peripheral driver, a call control for controlling the peripheral driver and accessing application programs and the system configuration data, and a protocol converter for passing control and data messages in manners proprietary to each peripheral communications device from and to the peripheral communications devices via peripheral drivers and to and from a variety of standard and non-standard application programs stored in the computer system.

In accordance with another embodiment, a communication system is comprised of a local area network (LAN), a computer system connected to the LAN including apparatus for storing and processing applications programs, one of the applications programs being a program for controlling a communications device, a telecommunications server connected to the LAN including apparatus for controlling connection of communications peripheral devices, communications devices connected to the server, the server comprising apparatus for receiving a request for service from one of the communications devices, for passing a message to the computer system via the LAN, for receiving control messages resulting from the computer system processing a program for controlling a communications device and for controlling at least one of connections and operation of the communications device dependent on the character of the control messages, and having a database for storing server system configuration data, a peripheral driver, a call control for controlling the peripheral driver and accessing application programs and the system configuration data, and a protocol converter for passing control and data messages in manners proprietary to each peripheral communications device from and to the peripheral communications devices via peripheral drivers and to and from a variety of standard and non-standard application programs stored in the computer system.

BRIEF INTRODUCTION TO THE DRAWINGS

A better understanding of the invention will be obtained by reading the description of the invention below, with reference to the following drawings, in which:

FIG. 1 is a basic block diagram of the invention,

FIGS. 2 and 3 are block diagrams of the invention shown in slightly different form, used to describe basic operation of the invention, FIG. 4 is a diagram illustrating the architecture of the system of the invention, FIG. 5 is a block diagram illustrating a distributed form of architecture of the system, in accordance with another embodiment, and FIG. 6 is a diagram illustrating a process of initializing the invention.

DETAILED DESCRIPTION OF THE INVENTION

Figure 1:
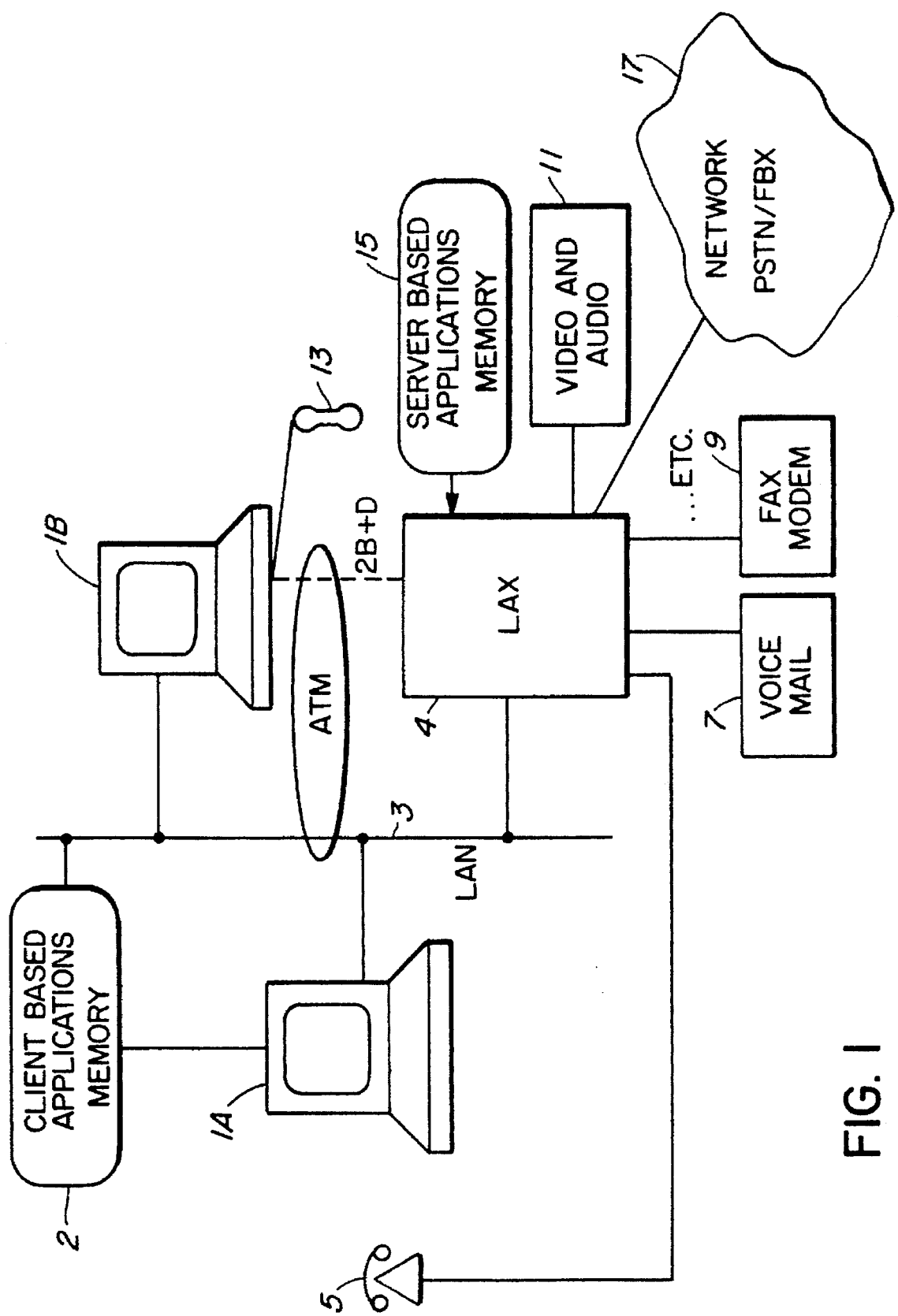

Turning to FIG. 1, computers 1A and 1B are connected to a LAN 3 in a standard, well known manner. Each of the computers contains a memory 2, containing client based application programs. The computers operate in a well known manner, and communicate with each other or access servers (not shown) such as an applications program server, a fax modem server, etc., connected to the LAN in a well known manner.

In accordance with the present invention, a local area communications server (LAX) 4 is connected to the LAN. Telephone sets 5, a voice mail device 7, a fax modem 9, a video and audio input 11 and/or input/output interface, etc., may be connected to the LAX. One or more computers may have an interface circuit to which a telephone handset 13 is connected, for voice communication along the LAN, or for communication through the LAX via a 2B+D digital line. The LAX is connected to a PBX or to other switching machines in a public switched network 17 via trunks 19.

The LAX contains a memory 15, which stores server based application programs.

Figure 2:
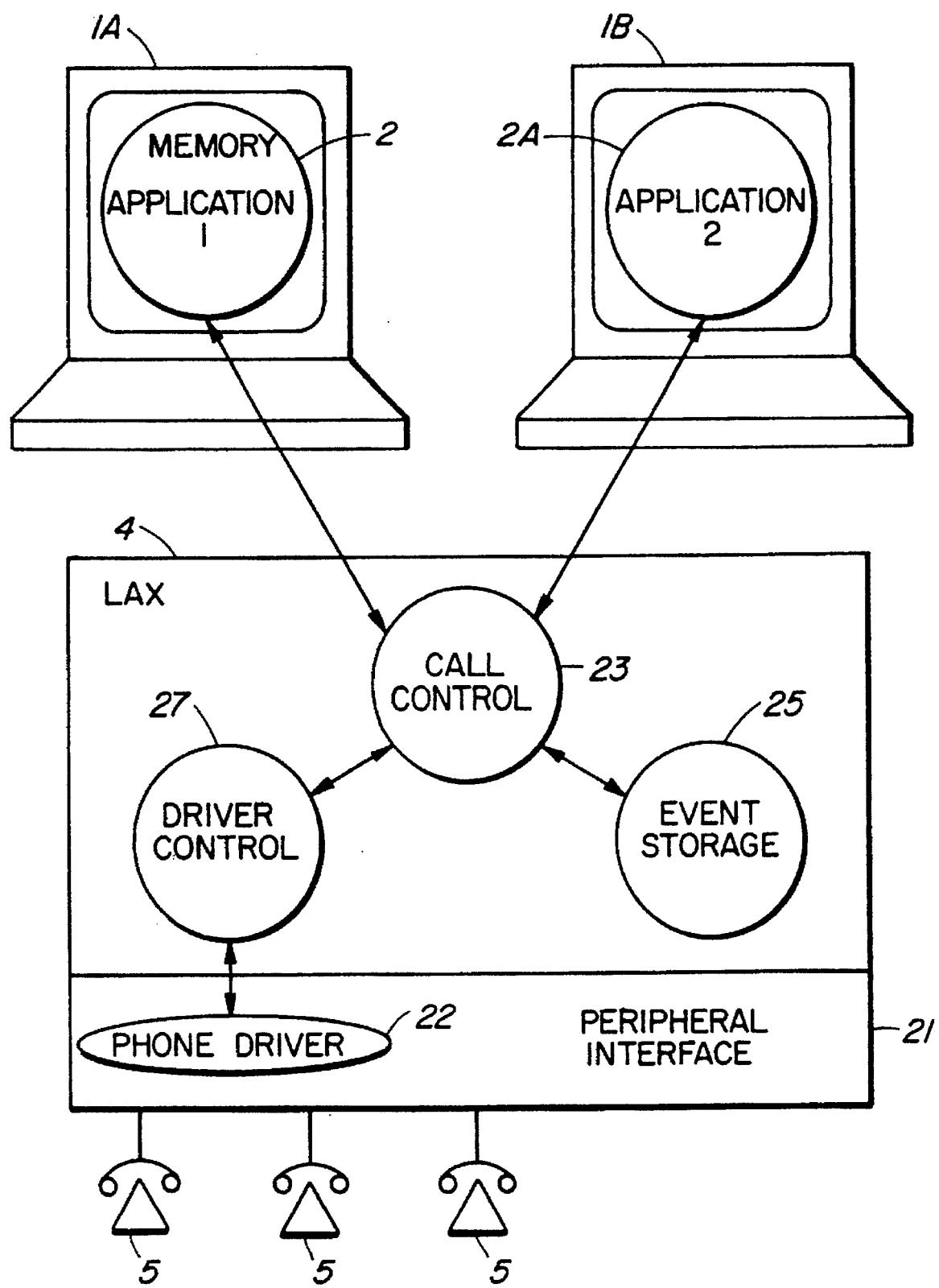

Operation of the system will be described with reference to FIG. 2, which shows certain elements in more detail.

The LAX 4 contains a peripheral interface circuit 21, and a peripheral driver 22 (which may be a hardware device but is preferred to be a peripheral driver program, and may be a combination of both) for interfacing telephone sets 5. The LAX also contains a processor controlled call control apparatus 23 (call control), and a memory 25 accessible from the call control apparatus 23. The call control 23 accesses programs in a driver control 27 for control of the peripheral driver 22. The peripheral driver 22 in this example is a telephone interface (e.g. line circuit) driver.

When a telephone 5 connected to the LAX goes off hook, the telephone driver detects this state, and reports it via a message to the driver control 27. Driver control 27 in response sends a message to call control 23. Call control 23 checks its database, and recognizes that the telephone set is associated with computer 1A, as shown in FIG. 1, and is expected to be used by the user of computer 1A. Telephone set 1A can be designated to be able to have features provided by an application stored in or controlled by an application program stored in memory 2 of computer 1A. The ability to be able to have the special features is stored in a database in a memory accessible to call control 23, in a manner similar to storage of a class of service associated with a telephone line. A user profile or user file designation may be stored in association with the telephone line, in the database.

Assuming that the driver control recognizes that the offhook telephone line is associated with a software application program, it sends a message over the LAN to computer 1A, and in particular to the application in memory 2, advising that the particular telephone line has gone offhook. Call control 23 also 20 instructs the driver control 27 to apply dial tone to the offhook telephone line, and to connect a dialing (dtmf) detector.

With dial tone applied to the telephone line, the user dials digits. The digits are received through the telephone driver 22 to driver control, which sends them to call control 23. Call control translates the dialled digits. Call control sends a message to the application in memory 2 of the computer via the LAN that the digits are being received, and if the application demands it, sends the digits whereupon the application can use them, e.g. by displaying them on the display of the computer, by invoking operation of an application program, etc. For example, the call control and the application program could reserve a wideband channel for multimedia between the computer and the LAX via the LAN.

Once the digits have been translated, call control looks up the dialled digits in its database, and recognizes that the dialled line or device has is marked as being able to be controlled by or has the facilities offered by an application program stored in memory 2A of computer 1B. Call control 23 thus offers the call to the application program stored in memory 2A in computer 1B, in a message via the LAN.

Assuming that the application program accepts the call, the call control 23 sends a message to driver control 27 to ring the called peripheral device. It also sends a message via the LAN to the application program in computer 1A that the second application has accepted the call, and that the called device is being rung. The application program, having been offered the call the characteristics of which are contained in the offering message (e.g. a multimedia call), reserves a wideband channel into the computer 1B via the LAN.

Assuming that the rung device goes offhook, this state is detected in phone driver 22 and driver control 27 is advised. This message is relayed through driver control to the call control 23, which connects the calling and called peripheral devices together, and informs both applications via the LAN that the call is connected. Connection of the call involves accessing the reserved channel space and connecting the devices together and to the computers via the wideband channel, assuming that a multimedia call has been requested.

Every event that occurs during the call is preferably stored in the event storage area of memory 25 by the call control, for billing and maintenance purposes, in order for the call control to detect where in the sequence it is, what services have been called for and what services have been set up.

For example, assuming that the two applications provide for video communications, a video camera associated with computer 1A and interfacing via a video interface circuit, provides a view of a first user, which is transmitted via the wideband channel on the LAN to the call control, which connects it to the wideband channel on the LAN reserved by the application program in computer 1B. A video interface of computer 1B controls display of the video signal in a window of the display of computer 1B. At the same time, audio from a telephone 5 used by the first user is connected by call control 23 to another telephone used by a second user associated with computer 1B, which need not pass through the LAN, but which may do so if preferred (e.g. to a loudspeaker). A video signal arising in association with the application stored in memory 2A of computer 1B may be sent to computer 1A in a similar manner, assuming that the reserved channels are two-way.

In case the data stored in the database associated with call control 23 indicates that there is no video capability associated with, say the application of computer 1B, the message to the first application will indicate it, and the application of computer 1B will act to provide its own audio or other facility. For example, the device that is rung may not answer, and the application at computer 1B may operate to store the calling number, look up the calling number in a database and store a name of a caller associated with the calling number, count up the number of unanswered calls, and provide a message on the display of the computer that the counted number of unanswered calls have come in. Upon request of the user, the application program may then display the number and name (and other characteristics, if desired), of the unanswered calling numbers.

If the call is to be completed when rung, the system will establish only an audio channel between calling and called devices, but the applications at both computers may provide specialized services to both users, such as calling up documents via the LAN from a server, which may be displayed on both displays of both computers for review and discussion by both users. Similarly, the application may allow either or both users to request video signals to be conferenced into the call for display on either or both computer displays, from video device 11, via a wideband channel through the LAX 4 and LAN 3.

Figure 3:
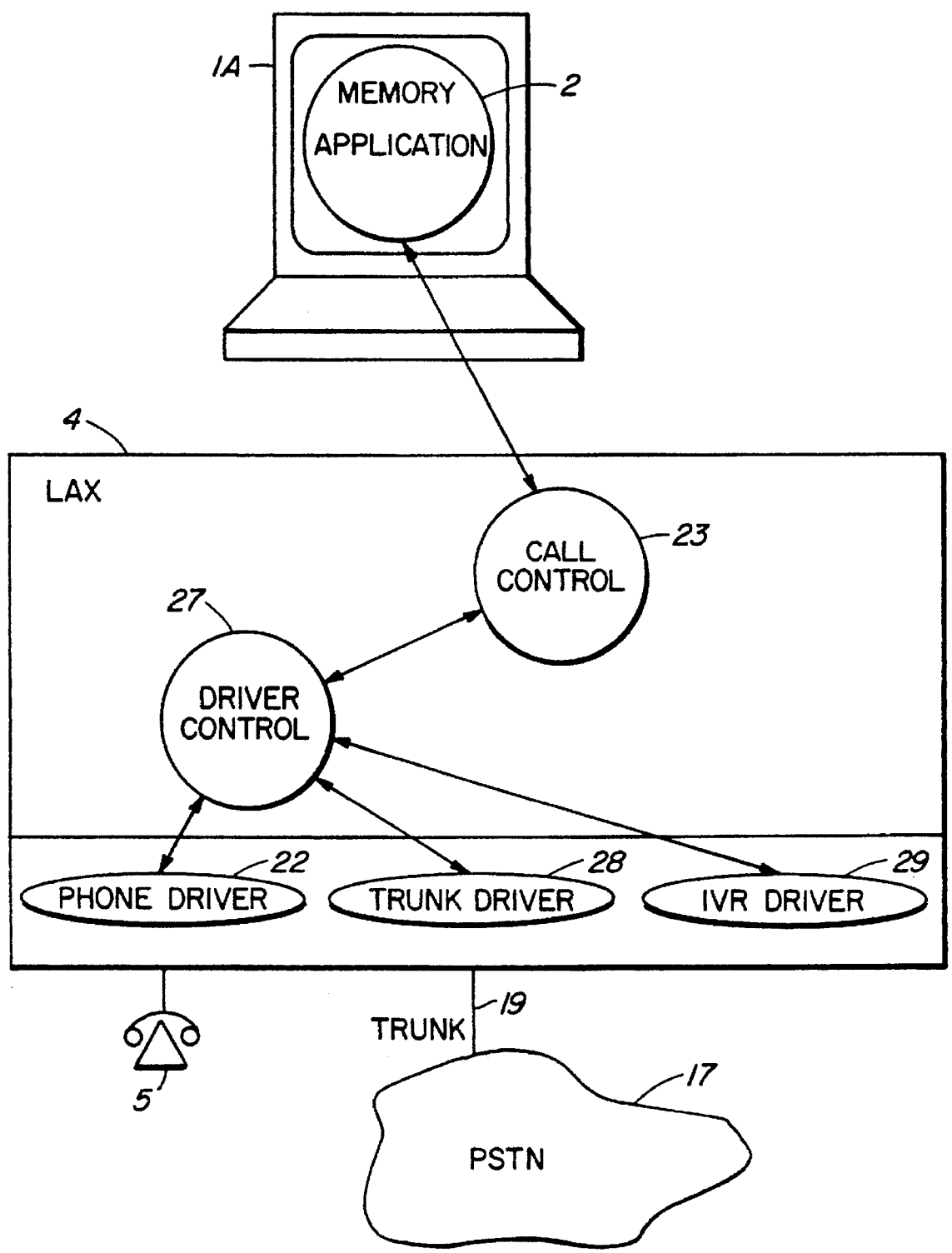

A second example of operation will be described with reference to FIG. 3. In this example an application program in memory 2 of computer 1A is associated with both a telephone 4 and an IVR. Upon request by a user of computer 1A, the application program sends a message via the LAN to call control 23 to make a call on behalf of the IVR, to digits specified by the application program or by the user. The call control 23 then translates the digits, and selects a trunk 19 leading to public switched telephone network 17.

Since the trunk is selected by the call control 23, without instruction by the application program, it sends a message to driver control 27 to seize a trunk. It seizes a trunk by sending a message to a selected trunk driver 28. Upon seizing a trunk, a message is sent from trunk driver 28 to driver control 27 to call control 23, which in response sends digits to be transmitted via the trunk to driver control, with a message to send them. The driver control sends a transmit message to trunk driver 28 followed by the digits to be transmitted, which are transmitted via the trunk 19.

When the trunk answers the call, trunk driver 28 sends a message to the driver control 27, which sends a message to the call control 23, which sends a message via the LAN to the application program that the call has been answered. Since the call was made on behalf of the IVR, call control then automatically connects the trunk to the IVR via the IVR driver 29. Once the connection has been made, a message is sent to the application program from the call control 23 via the LAN that the connection has been made.

Upon receiving the message that the connection has been made between the trunk and the IVR, the application sends a message back to the call control 23 to transfer the call to the telephone line of telephone 5. If the line is on hook, as determined by the call control checking the telephone driver 22 via driver control 27, the driver control is sent a message by call control 23 to seize the telephone line. Once seizure has been confirmed, a message is sent back to the call control confirming, and driver control is instructed by call control to apply ringing to the telephone line.

When the telephone is answered, it goes offhook, and a message is sent from the driver control 27 to the call control 23, which automatically connects the telephone line to the trunk 19. Call control sends a message via the LAN to the application program that the call has been connected.

The application program has thus been used to supply the dialling information required to set up a call, and the user need not answer his telephone set until the call has been set up and answered at the called telephone, thus saving considerable time for the user.

Figure 4:
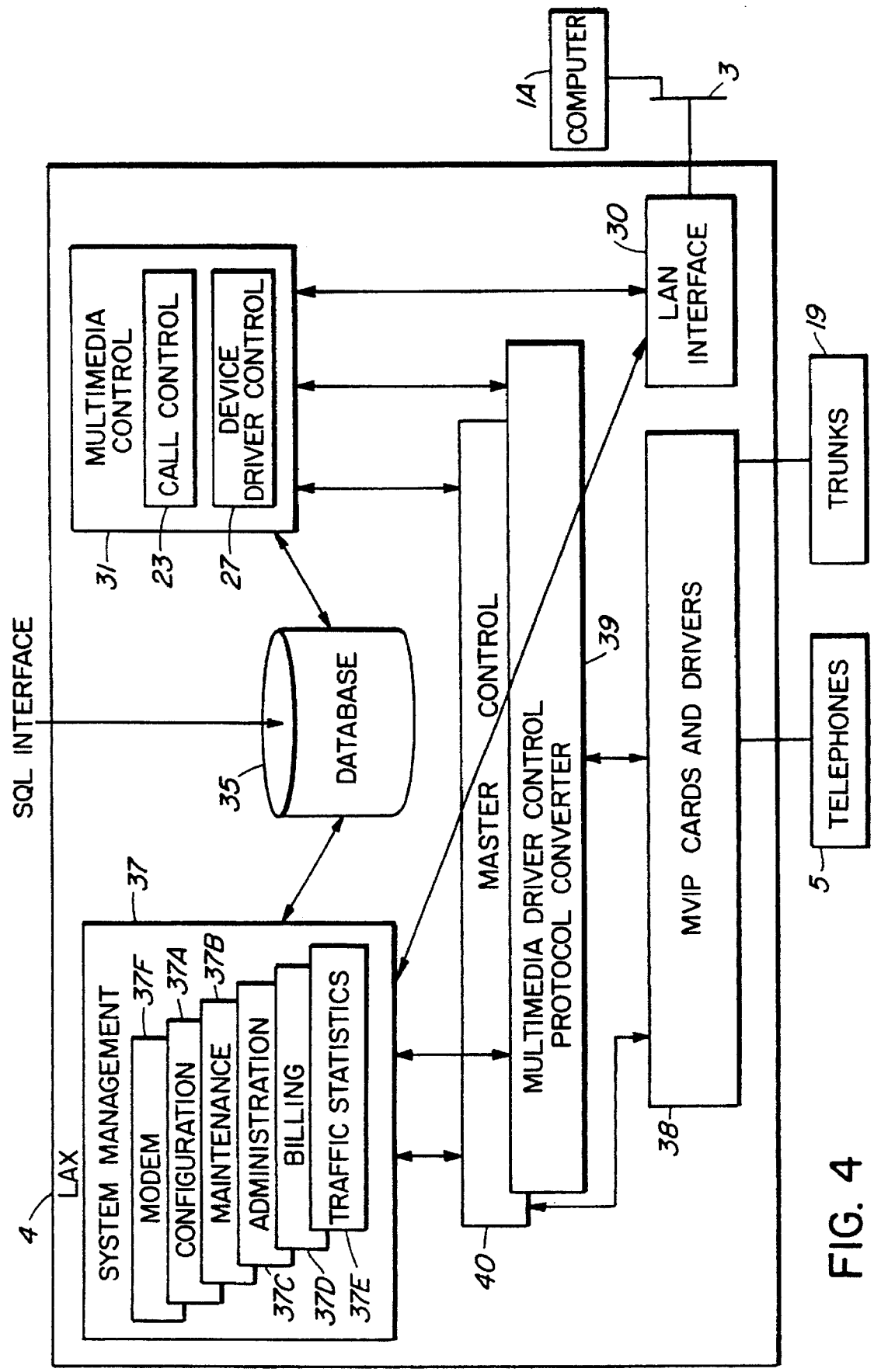

A preferred operation program architecture of the LAX is illustrated in FIG. 4. The hardware may be comprised of a microprocessor and random access memory (RAM) connected to a main bus, to which peripheral circuits are connected via one or more peripheral driver control circuits. Peripherals such as those described earlier are connected to the driver control circuits. In addition, the main bus is connected via a LAN bridge or interface circuit to the LAN. The particular programs and database to be described below are stored in the RAM, except as will be noted. Alternatively each program or program layer to be described may be provided by firmware or hardware. A LAN interface 30 interfaces the LAX, e.g. by connection to its main bus, to the LAN 3.

A multimedia control 31 is comprised of the aforenoted call control 23 and driver control 27. By separating the call control and driver control, different applications developers may provide specialized useful functions in the call control and driver control in addition to those examples given in this specification.

The call control can control the call by itself, or can allow applications in computers or other devices connected to the LAN to control it or receive messages from it. For example it may interact with an asynchronous transfer mode (ATM) interface 33 connected to the LAN. It can also give up control to a higher level application.

As will be understood from the earlier description, the call control 23 is responsible for driving a call through its various states, and for providing various necessary tones and connections, if not provided by a higher level application.

The driver control 27 preferably performs pure decision point call processing, and acts as instructed by messages received from the call control 23.

Stored in the RAM of the LAX is database 35, referred to earlier with respect to the described examples, which interacts with multimedia control 31, as well as a system management program 37. The database can be provided by a commercial database program such as dbase IV which provides a standard user interface for programming.

The system management program 37 is preferably comprised of a configuration program 37A, a maintenance program 37B, an administration program 37C, a billing program 37D and a traffic statical gathering and/or analysis program 37E. Data used by and gathered by the system management program is stored in the database 35.

The LAX also includes a protocol converter, which interacts with the multimedia control 31 and the system management 37. The protocol converter configures the peripheral devices in their own proprietary ways, and thus to allow data to pass from the LAX to a variety of peripheral devices having different communication protocols. Separate tables are maintained in the database that describe each protocol, with a dynamic link between them. A common protocol is preferred to be use for maintenance terminal input and network management. Data resulting from background diagnostics of various peripheral devices performed by the maintenance program 37B in proprietary form is also translated by the protocol converter for use by the LAX.

The actual connection control is performed by a master control 40, under control of messages provided by driver control 27. It also can be controlled by system management 37, for example the configuration program 37A. The master control 40 interfaces directly with peripheral drivers as described above, or may be comprised of the drivers.

Thus as shown in FIG. 4, both the master control 40 and the protocol converter 39 interface peripheral drivers 38 (or circuits, if they contain their own drivers).

While in the preferred embodiment, data resulting from statical analysis, billing, logs and alarms is stored in the database, it is intended that this data could be stored and/or further processed outside the LAX either by providing it to one or plural ports, or by encoding it and applying it to the LAN for storage or processing by a computer or other device, and/or for printout by a printer that may be connected to the LAN either by a LAN interface circuit or by a print server.

Figure 5:
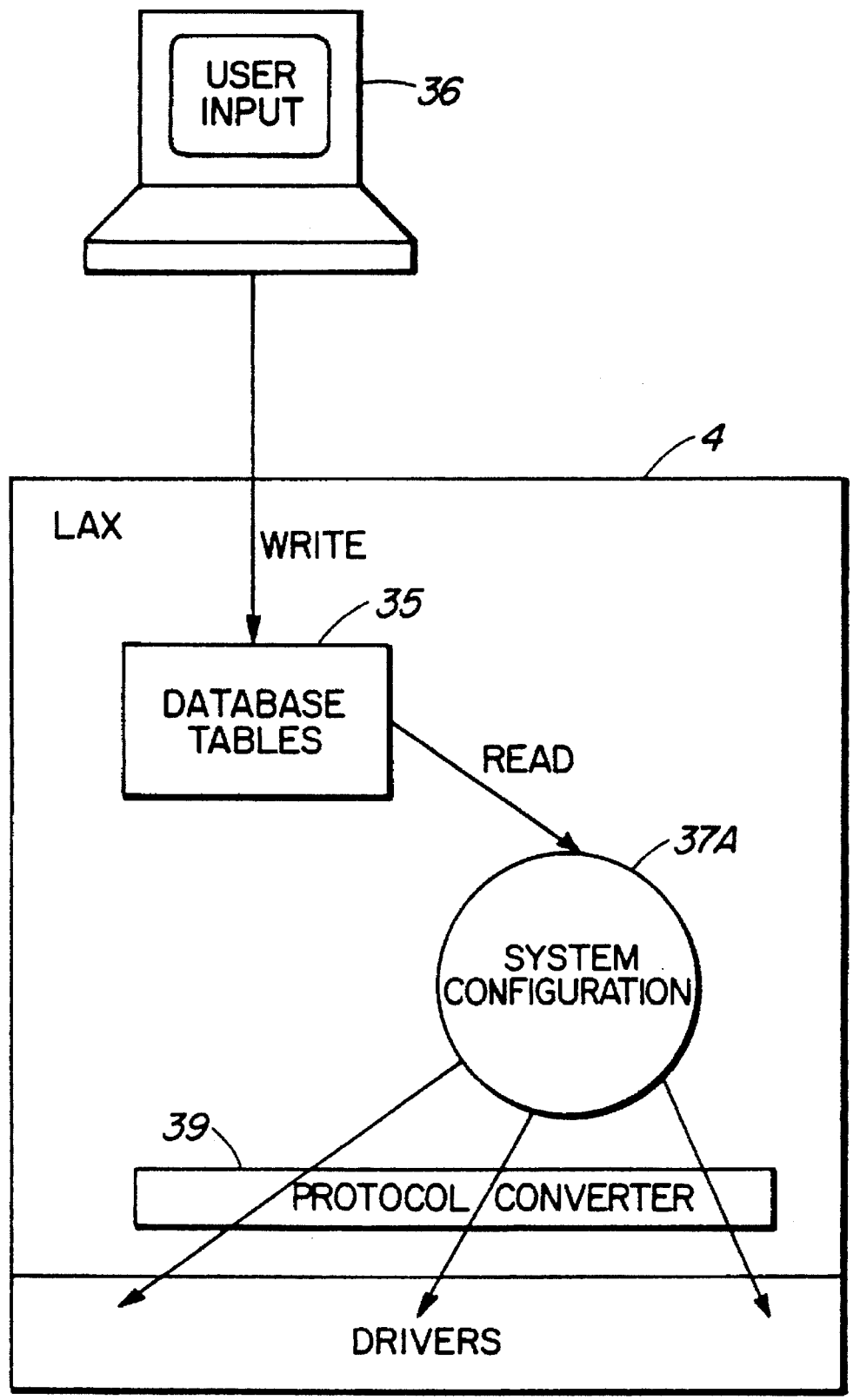

Configuration of the system is described with reference to FIG. 5. A user inputs configuration data on a terminal 36 connected to the main bus of the LAX, which data is stored in various tables in database 35. The system configuration program 37A reads these tables, and sends messages to the various drivers of the system to initialize the hardware associated with them. For transmission of various initialization messages created by the system configuration program, the messages are passed through protocol converter 39 in order that they be converted into correct proprietary form for each of the peripherals.

Figure 6:
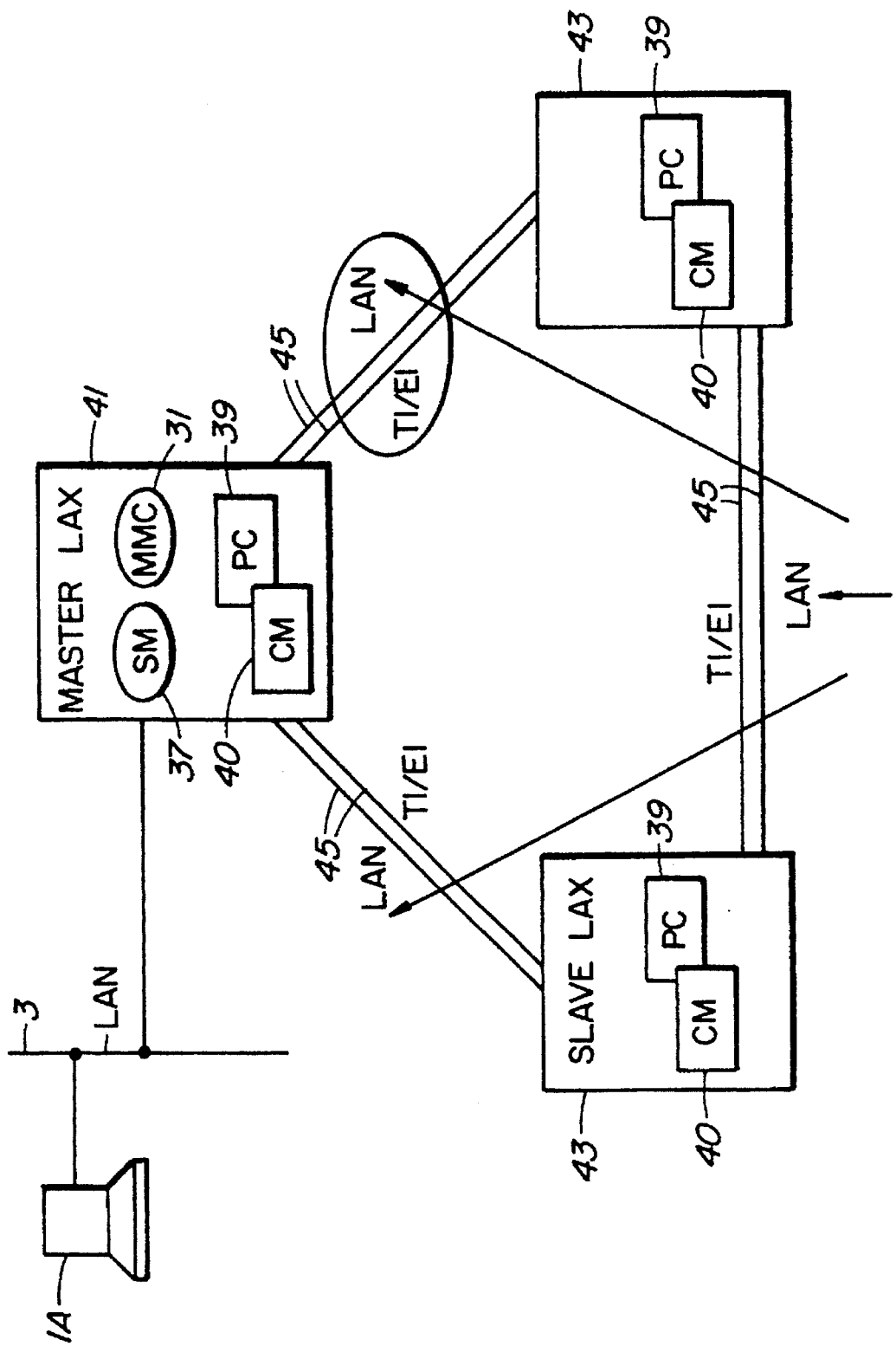

The LAX may be created in distributed form, as shown in FIG. 6. In this case a master LAX 41 is connected to slave LAXs 43 by means of data links such as LANs and T1/E1 transmission paths 45 or other wide bandwidth transmission media such as wireless links. Peripherals are connected to each of the LAXs. In this case it is preferred that the higher level application programs such as the multimedia control 31 and system management 37 should reside in the master LAX, while a separate protocol converter 39, which of course must provide data signals to the peripherals in accordance with their own proprietary form, should reside in each of the LAXs. In addition, a master control, which controls connection under control of the driver control for each individual peripheral, should reside in each of the LAXs.

Thus if a peripheral device for which a message is determined by the master LAX 41 looking up its database as not connected to the master LAX, the master LAX 41, determining which slave LAX 43 it is connected to by the data in its database, sends the message via the LAN, T1/E1 links to the correct slave LAX.

It will be recognized that the computers connected to the LAN and the LAN driving software may use various operating systems, such as OS/2, SCO Unix, Novell Netware, and Windows NT. To accommodate this, the programs contained in the LAX that send messages via the LAN should be contained in a program layer that converts the messages to the appropriate operating system protocol. It is preferred that the operating system protocol conversion should be performed by an external layer in order to have the applications as independent as possible, in order to facilitate simplest development of a variety of application programs for both the LAX and the computer.

It is also understood that various protocols may be developed to control via computer communications via a LAN having communication lines interfaces. It is intended that such protocols can be easily extended in order that they can control devices connected to the LAX, instead of controlling devices connected to the computer.

A person understanding this invention may now conceive of alternative structures and embodiments or variations of the above. All of those which fall within the scope of the claims appended hereto are considered to be part of the present invention.

We claim:

1. A communication system comprising:
   (a) a local area network (LAN),
   (b) a computer system connected to the LAN including means for storing and processing applications programs, one of said applications programs being a program for controlling a communications device,
   (c) a telecommunications server connected to the LAN including means for controlling connection of communications peripheral devices,
   (d) communications devices connected to said server,
   (e) said server comprising means for receiving a request for service from one of the communications devices, for passing a message to said computer system via the LAN, for receiving control messages resulting from said computer system processing a program for controlling a communications device and for controlling at least one of connections and operation of said communications device dependent on the character of said control messages, and having (i) a database for storing server system configuration data, (II) a peripheral driver, (iii) a call controller for controlling the peripheral driver and accessing application programs and the system configuration data, and (iv) a protocol converter for passing control and data messages in manners proprietary to each peripheral communications device from and to said peripheral communications devices via peripheral drivers and to and from a variety of standard and non-standard application programs stored in said computer system; and
   (f) a system management means for initializing the server and configuring the server in accordance with data stored in the database.

2. A communications system as defined in claim 1, wherein the call controller communicates with external data interface means via the LAN.

3. A communications system as defined in claim 1 including means for storing various server control applications programs in the server for controlling the call controller and the peripheral driver.

4. A communications system as defined in claim 1, wherein the system management means comprises a maintenance control program, an administration control program, a billing control program and a traffic statistics program for respectively maintaining, advertising, billing and gathering and analyzing statistically the operation of the server.

5. A communications system as defined in claim 1 wherein data gathered and generated by the system management means is stored in the database.

6. A communications system as defined in claim 1 in which the means for controlling connection of the communications devices is a master controller operating under control of messages provided by a peripheral driver controller.

7. A communications system as defined in claim 6, wherein the master controller interfaces the peripheral drivers directly.

8. A communications system as defined in claim 6, wherein the master controller is comprised of the peripheral drivers.

9. A communications system as defined in claim 1 in which the means for controlling connection of the communications devices is a master controller operating under control of messages provided by the management means.

10. A communication system as defined in claim 1 wherein the server is distributed in several locations, the server at one location being defined as a master and the servers at the other locations being defined as slaves, the master and slaves being interconnected by LANS and wide bandwidth data transmission media, the master and each slave having a protocol converter and master controller, the master having said system management means, peripheral devices being connected to each of the master and slaves, signals to and from the peripheral devices of each of the master and slaves being translated by a protocol converter of the associated master or slave, connection of the peripheral devices to each other or to others via a LAN or data transmission line being controlled by a master controller of the associated master or slave, and said applications programs for operation of all of the master and slave being stored in association with the master for accessing thereof by the system management means and control of all of said master and slaves.

11. A system as defined in claim 1, in which at least one of the communications devices is an interface to a public switched network.

12. A system as defined in claim 1, in which said communications devices are comprised of at least one of a computer interface, a video interface, a fax modem, a data modem, an electronic mail system and a voice mail system.

13. A system as defined in claim 12, in which at least one of the communications devices is an interface to a public switched network.

14. A communication system comprising a computer system connected to a LAN, a local area communications system (LAX) connected to the LAN, peripheral communications devices connected to the LAX, means for controlling communications between said devices via the LAX under control of programs resident in a computer of said computer system; said controlling means comprising (i) a database for storing server system configuration data, (ii) a peripheral driver, (iii) a call controller for controlling the peripheral driver and accessing application programs and the system configuration data, and (iv) a protocol converter for passing control and data messages in manners proprietary to each peripheral communications device from and to said peripheral communications devices via peripheral drivers and to and from a variety of standard and non-standard application programs stored in said computer system; and a system management means for initializing the LAX and configuring the LAX in accordance with data stored in the database.

15. A system as defined in claim 14, wherein the LAX is connected to a public switched network for receiving calls from and transmitting calls to, the public switched network.

16. A system as defined in claim 14, integrated into a PABX.

* * * * *